United States Patent [19]
Rydelek

[11] Patent Number: 6,113,286
[45] Date of Patent: Sep. 5, 2000

[54] DUAL-PIVOT SHUTTER DEVICE

[75] Inventor: James G. Rydelek, Henrietta, N.Y.

[73] Assignee: Eastman Kodak Company, Rochester, N.Y.

[21] Appl. No.: 09/316,861

[22] Filed: May 21, 1999

[51] Int. Cl.$^7$ .................................................. G03B 9/10
[52] U.S. Cl. .......................... 396/493; 396/452; 396/495
[58] Field of Search ................................... 396/452, 493, 396/495, 6

[56] References Cited

U.S. PATENT DOCUMENTS

| | | | |
|---|---|---|---|
| 1,701,121 | 2/1929 | Riddell | 396/493 |
| 3,672,285 | 6/1972 | Stoneham | 396/493 |
| 3,816,843 | 6/1974 | Couture | 396/493 |

*Primary Examiner*—Russell Adams
*Attorney, Agent, or Firm*—Roger A. Fields

[57] ABSTRACT

A shutter device comprises a single piece having a blade portion that includes an impact receiving member which when impacted in an opening direction with a shutter actuator moves the blade portion to uncover an aperture, a first resilient portion bendable about a first pivot point to allow movement of the blade portion to uncover the aperture and reversible about the first pivot point to move the blade portion to recover the aperture, and a second resilient portion bendable about a second pivot point to allow movement of the blade portion without uncovering the aperture, in order to permit the shutter actuator to move the impact receiving member out of its way when the shutter actuator is returned in a reverse direction.

6 Claims, 6 Drawing Sheets

DUAL-PIVOT SHUTTER DEVICE

FIELD OF THE INVENTION

The invention relates generally to the field of photography, and in particular to shutters devices for cameras.

BACKGROUND OF THE INVENTION

It is conventional for a camera to have an aperture through which ambient light is passed to cause a film exposure, at least one shutter blade pivotable open to uncover the aperture to permit ambient light to pass through the aperture and pivotable closed to re-cover the aperture, a spring-urged shutter actuator movable to pivot the shutter blade open, and a shutter release button manually depressible to release the shutter actuator to permit the shutter actuator to be spring-urged to pivot the shutter blade open.

Problem

In relatively inexpensive simple cameras, for example so-called one-time-use or disposable cameras, it is a continuing goal to design a low-cost effective shutter device.

SUMMARY OF THE INVENTION

According to the invention, a shutter device comprises:

a single piece having a blade portion that includes an impact receiving member which when impacted in an opening direction with a shutter actuator moves the blade portion to uncover an aperture, a first portion constrained for movement to allow the blade portion to be moved to uncover the aperture and reversible to move the blade portion to recover the aperture, and a second portion constrained for movement to allow the blade portion to be moved without uncovering the aperture, in order to permit the shutter actuator to move the impact receiving member out of its way when the shutter actuator is returned in a reverse direction.

More specifically, the first portion is resilient to be bendable about a first pivot point to allow movement of the blade portion to uncover the aperture and to be reversible about the first pivot point to move the blade portion to recover the aperture, and the second portion is resilient to be bendable about a second pivot point to allow movement of the blade portion without uncovering the aperture, in order to permit the shutter actuator to move the impact receiving member out of its way when the shutter actuator is returned in a reverse direction.

DETAILED DESCRIPTION OF THE INVENTION

The invention is disclosed as being embodied preferably in a shutter device for so-called a one-time-use or disposable camera. Because the features of a shutter device are generally known, the description which follows is directed in particular only to those elements forming part of or cooperating directly with the disclosed embodiment. It is to be understood, however, that other elements may take various forms known to a person of ordinary skill in the art.

Figure 1:
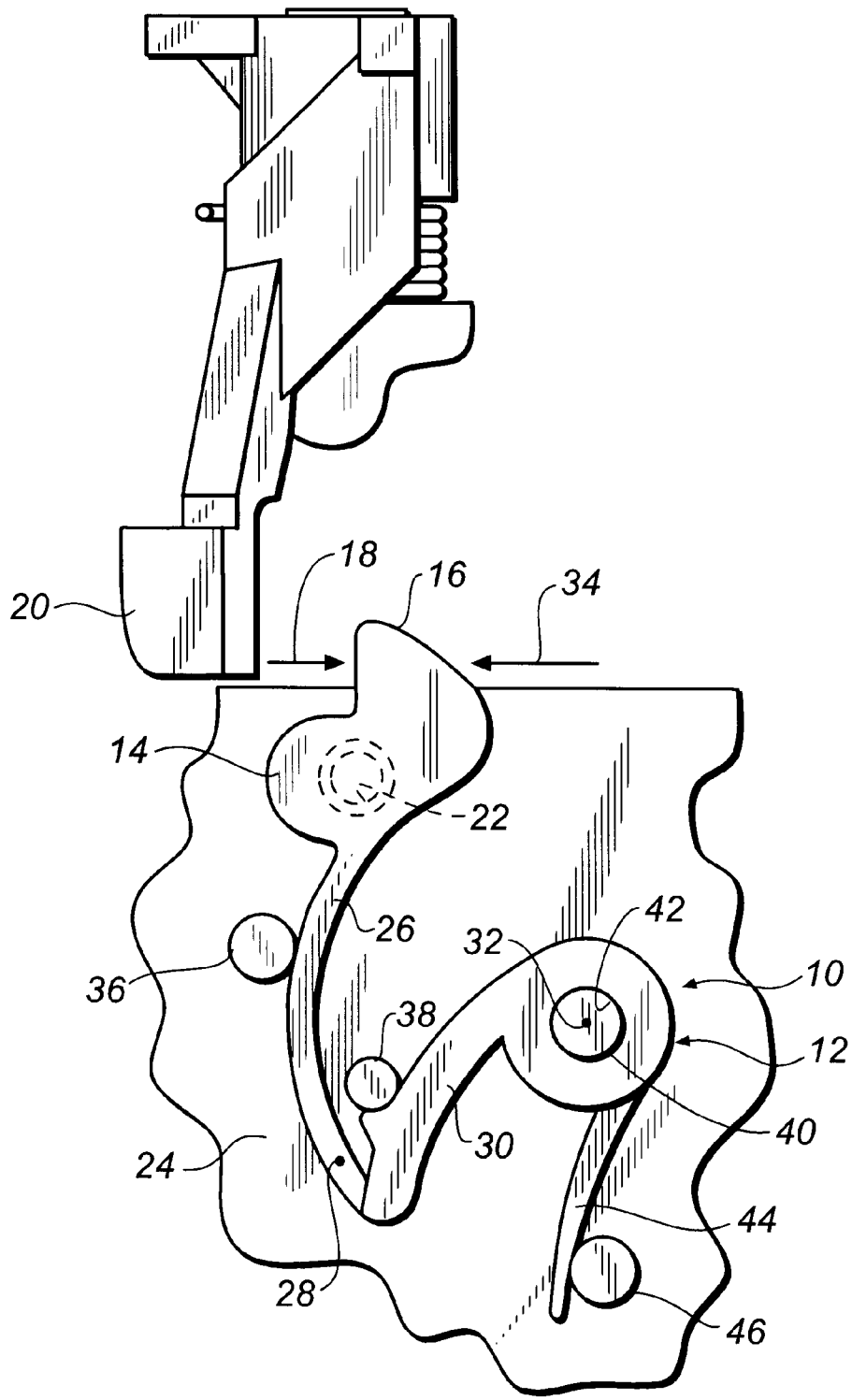
FIGS. 1, 2, 3 and 4 are front elevation views of a shutter device which is a preferred embodiment of the invention, depicting operation of the shutter device.
Figure 2:
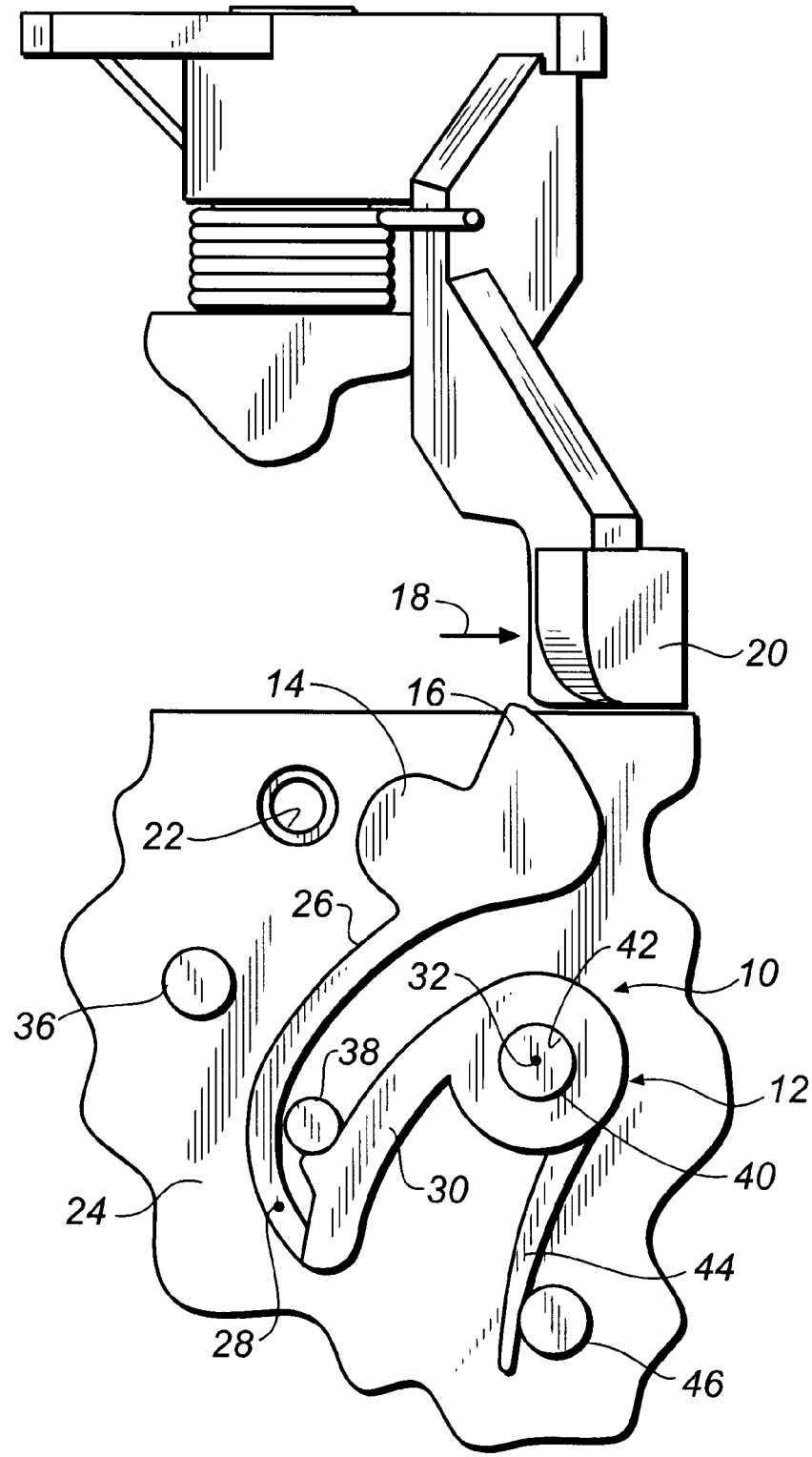
Figure 3:
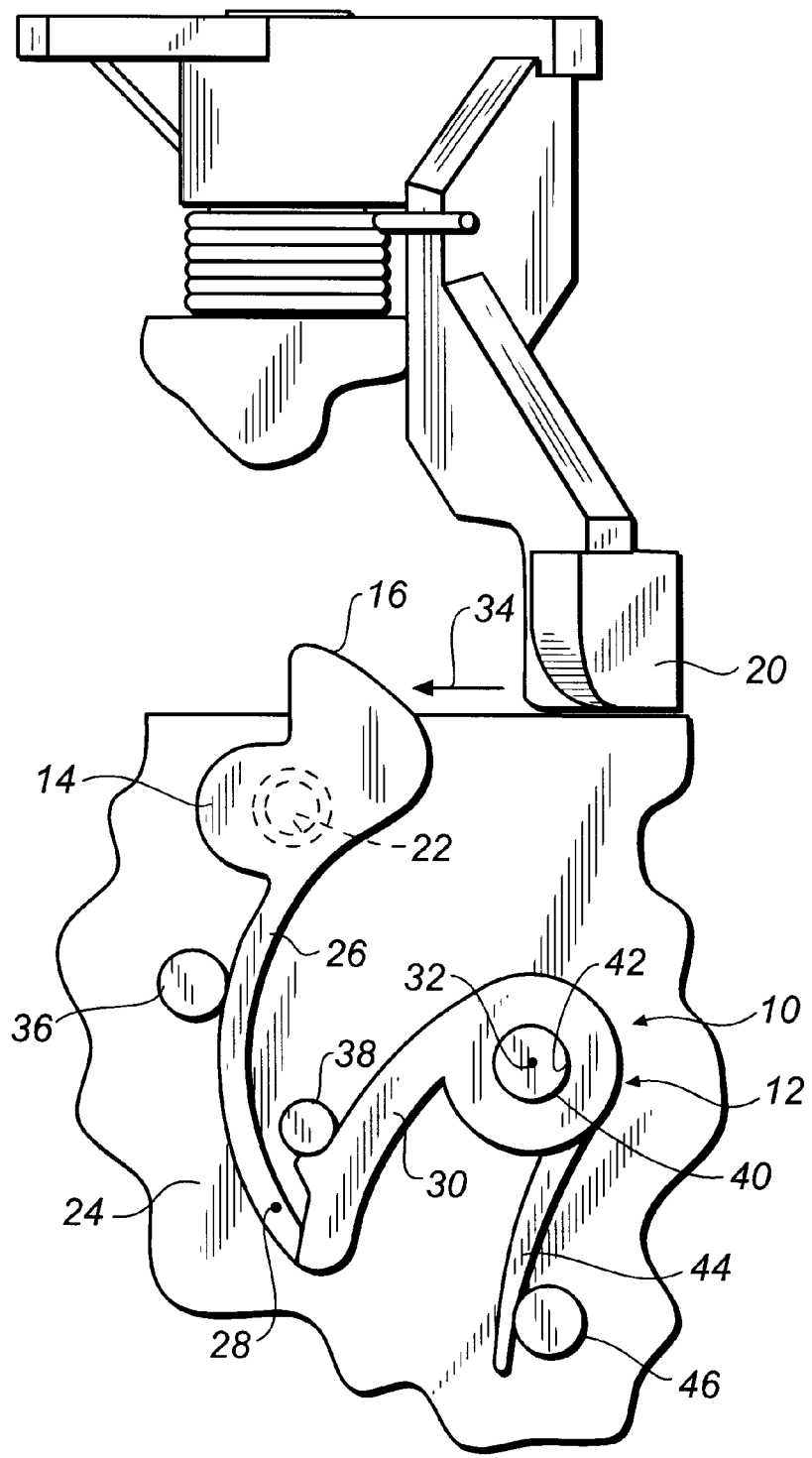
Figure 4:
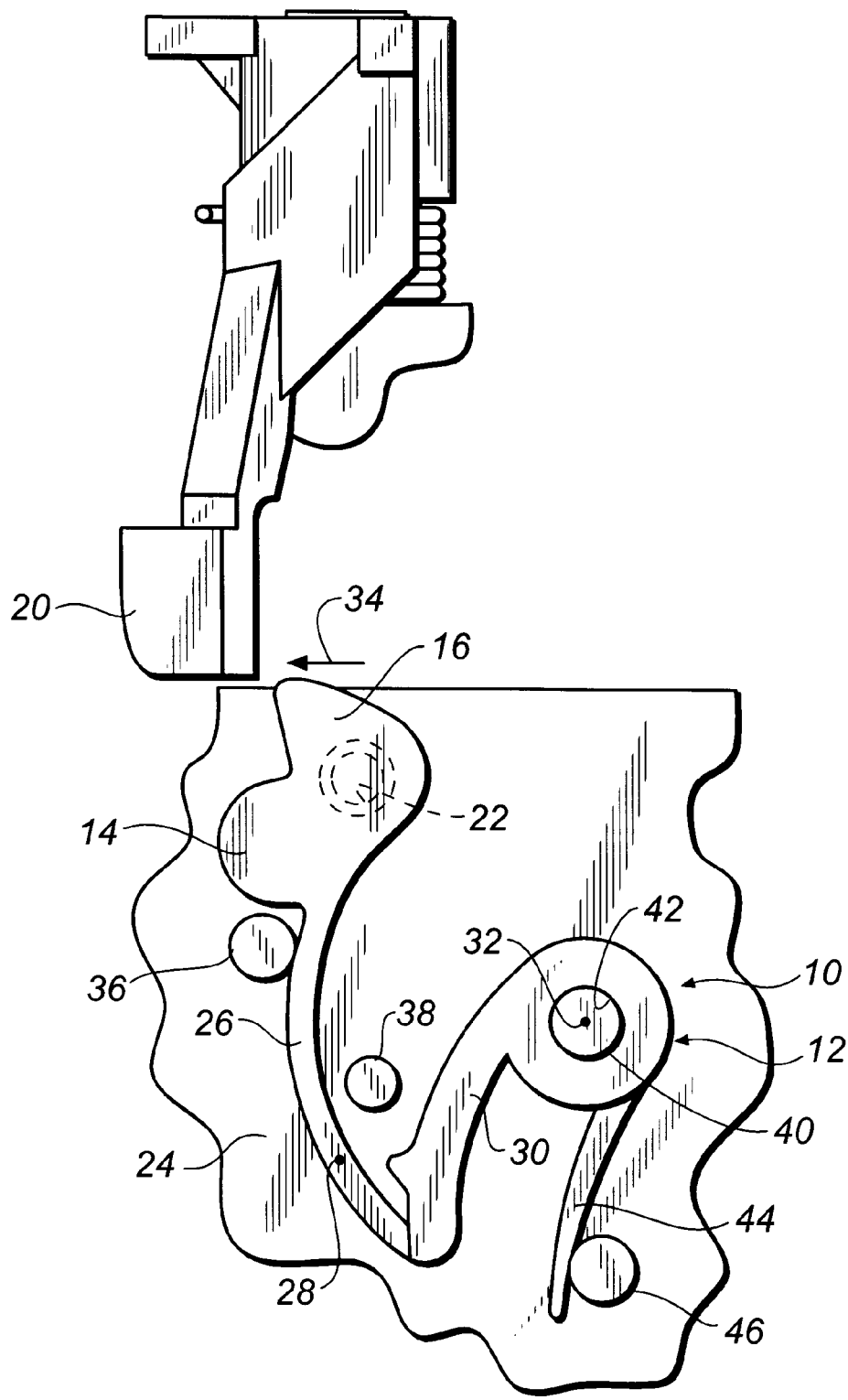
Figure 5:
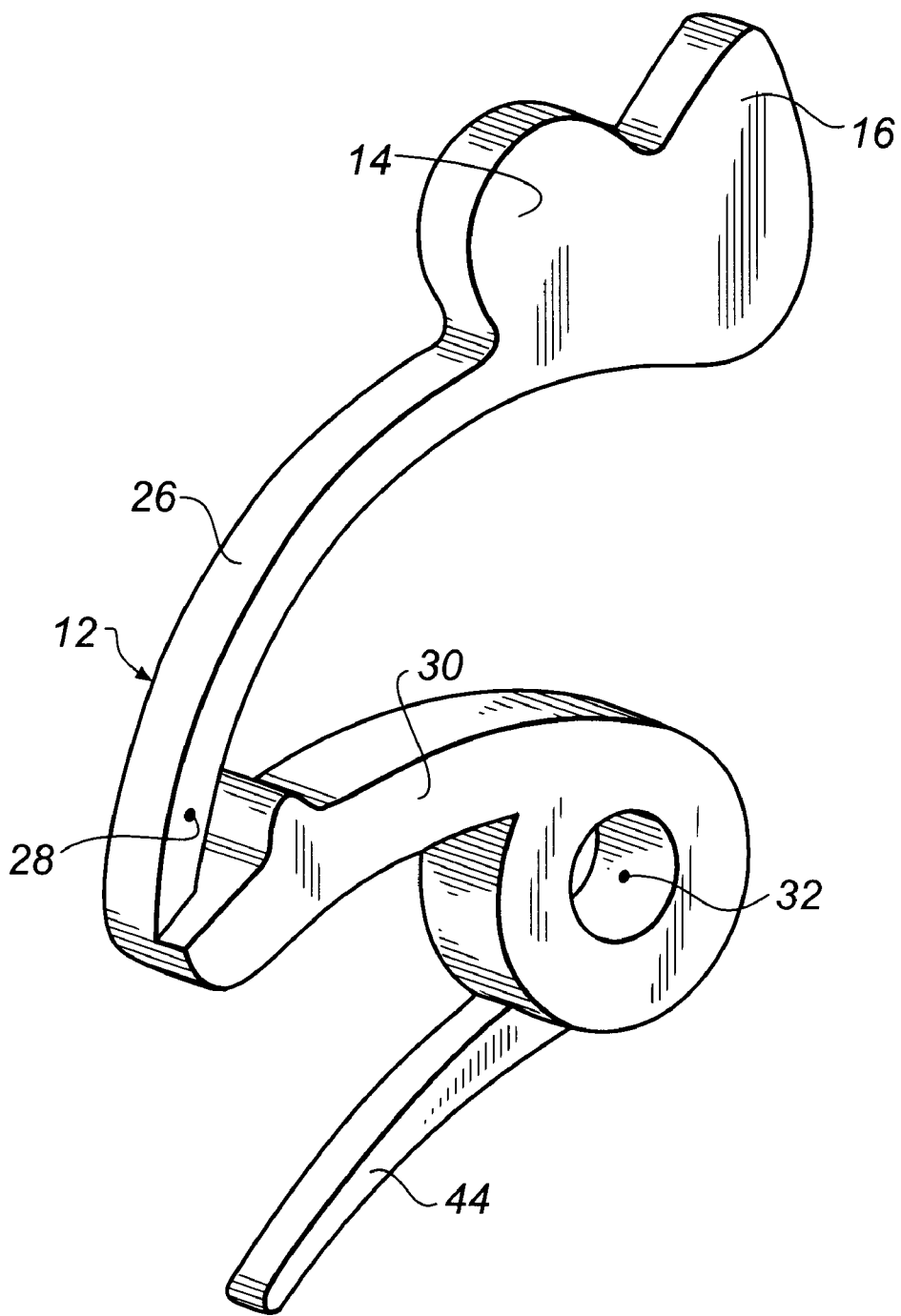
FIGS. 5 and 6 are perspective views of the shutter device as seen from different angles.
Figure 6:
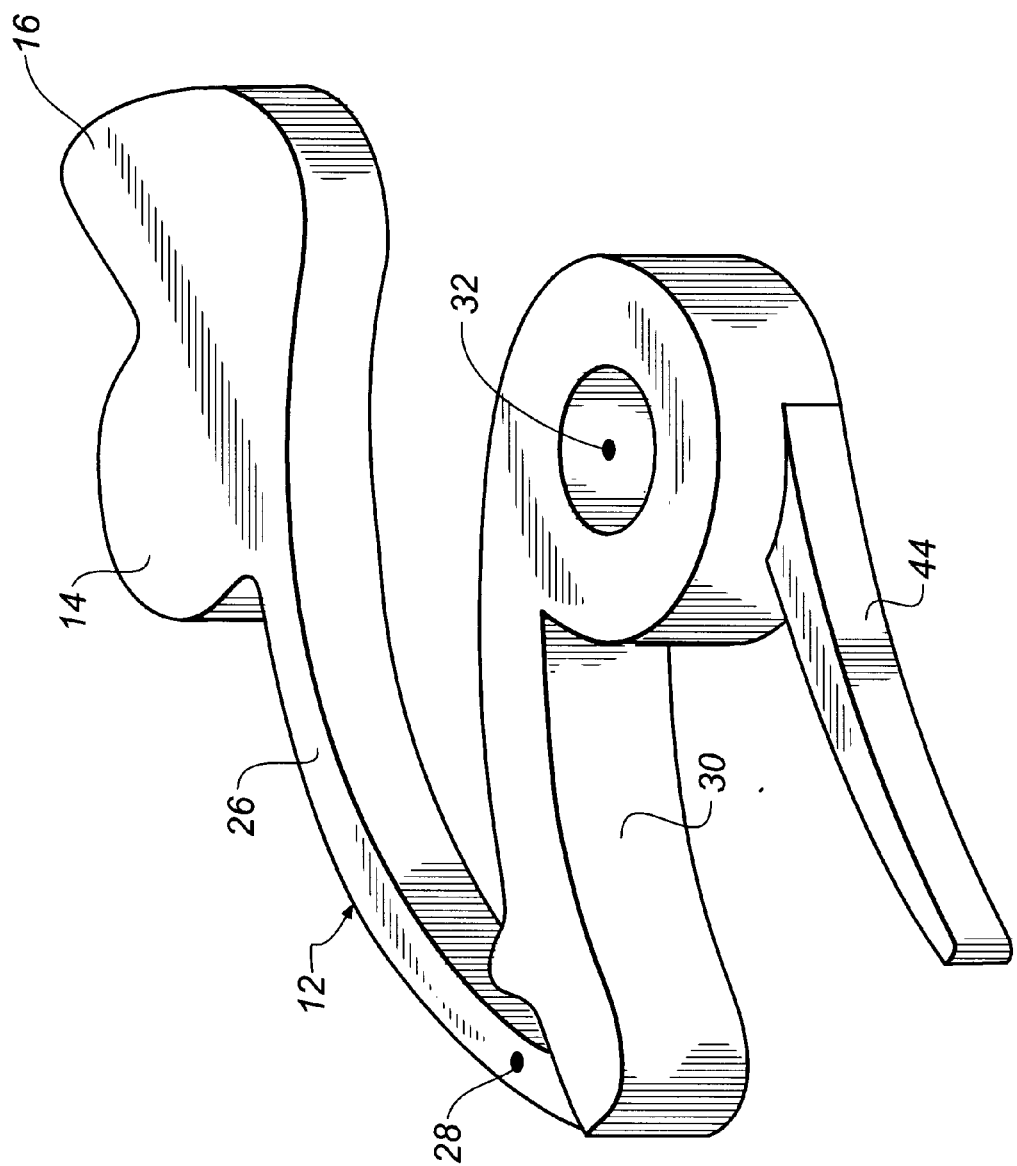

Referring now to the drawings, FIGS. 1–6 show a shutter device 10 comprising a single piece 12 having a blade or cover portion 14 that includes an impact receiving member 16 which when impacted in an opening direction 18 with a known spring-urged shutter actuator 20 swings the blade portion to uncover an exposure aperture 22 in a wall 24 (as shown in FIG. 2), a first resilient longitudinal portion 26 bendable clockwise about a first pivot point 28 to allow movement of the blade portion to uncover the exposure aperture (as shown in FIG. 2) and reversible counter-clockwise about the first pivot point to swing the blade portion to recover the exposure aperture (as shown in FIG. 3), and a second resilient longitudinal portion 30 bendable counter-clockwise about a second pivot point 32 to allow movement of the blade portion without uncovering the exposure aperture, in order to permit the shutter actuator to depress the impact receiving member when the shutter actuator is returned in a reverse direction 34 (as shown in FIG. 4), and reversible clockwise about the second pivot point to return the blade portion (as shown in FIG. 1). The first resilient longitudinal portion 26 longitudinally extends from the blade portion 14, and the second resilient longitudinal portion 30 longitudinally extends from the first resilient portion. The blade portion 14 including its impact receiving member 16, and the first longitudinal portion 26, are coplanar, i.e. lie and act in the same plane.

A first stop 36 fixed on the wall 24 is positioned against the first resilient longitudinal portion 26 (as shown in FIG. 1) for the first resilient longitudinal portion to be separated from the first stop when the first resilient longitudinal portion is bent clockwise about the first pivot point 28 to allow movement of the blade portion 14 to uncover the exposure aperture 22 (as shown in FIG. 2) and for the first resilient longitudinal portion to return to the first stop when the first resilient longitudinal portion is reversed counter-clockwise about the first pivot point to swing the blade portion to recover the exposure aperture (as shown in FIG. 3). A second stop 38 fixed on the wall 24 is positioned against the second resilient longitudinal portion 30 (as shown in FIGS. 1–3) for the second resilient longitudinal portion to be separated from the second stop when the second resilient longitudinal portion is bent counter-clockwise about the second pivot point 32 to allow movement of the blade portion 14 without uncovering the exposure aperture 22 (as shown in FIG. 4) and for the second resilient longitudinal portion to be reversed clockwise about the second pivot point and back against the second stop to return the blade portion (as shown in FIG. 1). A pivot post 40 fixed on the wall 24 is positioned within a hole 42 in the second resilient longitudinal portion 30 to support the second resilient longitudinal portion to be bent counter-clockwise and reversed clockwise about the second pivot point 32. A longitudinal finger-like member 44 longitudinal extends from the second resilient longitudinal portion 30 to against a restraining post 46 fixed on the wall 24. The first and second stops 36 and 38, the pivot post 40, the longitudinal finger-like member 44 and the restraining post 46 cooperate to constrain movements of the first and second resilient longitudinal portions 26 and 30.

Operation

When a known shutter release button (not shown) is manually depressed, the shutter actuator 20 is spring urged in the opening direction 18 against the impact receiving member 16 to swing the blade portion 14 to uncover the exposure aperture 22. See FIG. 2. At the same time, the first resilient longitudinal portion 26 is bent clockwise about the first pivot point 28 from against the first stop 36 to against the second stop 38. After the shutter actuator 20 has moved past the impact receiving member 16, the first resilient longitudinal portion 26 is free to reverse itself counter-clockwise about the first pivot point 28 and back against the first stop 36 to swing the blade portion 14 to recover the exposure aperture 22. See FIG. 3.

When the shutter actuator 20 is returned in the reverse direction 34, it depresses the impact receiving member 16 as it moves over the impact receiving member. See FIG. 4. This causes the second resilient longitudinal portion 30 to be bent counter-clockwise about the second pivot point 32 and away from the second stop 38, which allows movement of the blade portion 14 without uncovering the exposure aperture 22. Once the shutter actuator 20 is returned past the impact receiving member 16, the second resilient longitudinal portion 30 is free to reverse itself clockwise about the second pivot point 32 and back against the second stop 38 to return the blade portion 14. See FIG. 1.

The invention has been described with reference to a preferred embodiment. However, it will be appreciated that variations and modifications can be effected by a person of ordinary skill in the art without departing from the scope of the invention.

PARTS LIST

| | |
|---|---|
| 10. | shutter device |
| 12. | single piece |
| 14. | blade portion |
| 16. | impact receiving member |
| 18. | opening direction |
| 20. | shutter actuator |
| 22. | exposure aperture |
| 24. | wall |
| 26. | first resilient longitudinal portion |
| 28. | first pivot point |
| 30. | second resilient longitudinal portion |
| 32. | second pivot point |
| 34. | reverse direction |
| 36. | first stop |
| 38. | second stop |
| 40. | pivot post |
| 42. | hole |
| 44. | longitudinal finger-like member |
| 46. | restraining post |

What is claimed is:

1. A shutter device comprising:

a single piece having a blade portion that includes an impact receiving member which when impacted in an opening direction with a shutter actuator moves said blade portion to uncover an aperture, a first portion constrained for movement to allow said blade portion to be moved to uncover the aperture and reversible to move said blade portion to recover the aperture, and a second portion constrained for movement to allow said blade portion to be moved without uncovering the aperture, in order to permit the shutter actuator to move said impact receiving member out of its way when the shutter actuator is returned in a reverse direction.

2. A shutter device comprising:

a single piece having a blade portion that includes an impact receiving member which when impacted in an opening direction with a shutter actuator moves said blade portion to uncover an aperture, a first resilient portion constrained to be bent to allow movement of said blade portion to uncover the aperture and reversible to move said blade portion to recover the aperture, and a second resilient portion constrained to be bent to allow movement of said blade portion without uncovering the aperture, in order to permit the shutter actuator to move said impact receiving member out of its way when the shutter actuator is returned in a reverse direction.

3. A shutter device comprising:

a single piece having a blade portion that includes an impact receiving member which when impacted in an opening direction with a shutter actuator moves said blade portion to uncover an aperture, a first resilient portion bendable about a first pivot point to allow movement of said blade portion to uncover the aperture and reversible about said first pivot point to move said blade portion to recover the aperture, and a second resilient portion bendable about a second pivot point to allow movement of said blade portion without uncovering the aperture, in order to permit the shutter actuator to move said impact receiving member out of its way when the shutter actuator is returned in a reverse direction.

4. A shutter device as recited in claim 3, wherein a first stop is positioned against said first resilient portion for said first resilient portion to be separated from said first stop when said first resilient portion is bent to allow movement of said blade portion to uncover the aperture and for said first resilient portion to return to said first stop when said first resilient portion is reversed to move said blade portion to recover the aperture, and a second stop positioned against said second resilient portion for said second resilient portion to be separated from said second stop when said second resilient portion is bent to allow movement of said blade portion without uncovering the aperture and for said second resilient portion to return to said second stop.

5. A shutter device as recited in claim 3, wherein said first resilient portion longitudinally extends from said blade portion, and said second resilient portion longitudinally extends from said first resilient portion.

6. A shutter device as recited in claim 3, wherein said blade portion including said impact receiving member, and said first resilient portion, are coplanar to act in the same plane.

* * * * *